United States Patent
Tailor

(10) Patent No.: US 7,423,999 B2
(45) Date of Patent: Sep. 9, 2008

(54) BLUETOOTH SERIAL ADAPTERS

(75) Inventor: Mahendra Tailor, Middlesex (GB)

(73) Assignee: Ezurio Ltd., London (GB)

( * ) Notice: Subject to any disclaimer, the term of this patent is extended or adjusted under 35 U.S.C. 154(b) by 269 days.

(21) Appl. No.: 10/524,935

(22) PCT Filed: Aug. 13, 2003

(86) PCT No.: PCT/GB03/03519

§ 371 (c)(1),
(2), (4) Date: Feb. 14, 2005

(87) PCT Pub. No.: WO2004/017575

PCT Pub. Date: Feb. 26, 2004

(65) Prior Publication Data

US 2006/0034231 A1   Feb. 16, 2006

(30) Foreign Application Priority Data

Aug. 14, 2002  (GB) ................................ 0218968.6

(51) Int. Cl.
*H04B 7/00* (2006.01)
*H04Q 7/00* (2006.01)
*H04Q 7/24* (2006.01)

(52) U.S. Cl. ........................ 370/338; 370/328; 370/469; 455/41.2; 455/556.1; 455/557

(58) Field of Classification Search ................. 370/338, 370/469, 331, 349, 400–401, 310, 310.2, 370/352–356, 363, 366, 383, 465–466, 329–321, 370/328; 455/41.2, 41.3, 569, 90.3, 575.1, 455/550.1, 418–420, 3.01–3.02, 556.1–556.2, 455/557–559, 73–74, 552.1; 348/14.02–14.05; 379/90.01, 102.01–102.07, 110.01
See application file for complete search history.

(56) References Cited

U.S. PATENT DOCUMENTS

| | | | | |
|---|---|---|---|---|
| 6,937,844 | B2* | 8/2005 | Malmstrom et al. | 455/41.2 |
| 2001/0030950 | A1* | 10/2001 | Chen et al. | 370/329 |
| 2002/0078284 | A1* | 6/2002 | McKenney | 710/200 |
| 2002/0198031 | A1* | 12/2002 | Holmes et al. | 455/569 |
| 2005/0088997 | A1* | 4/2005 | Melpignano | 370/338 |
| 2005/0176369 | A1* | 8/2005 | Holmes et al. | 455/41.2 |
| 2005/0208967 | A1* | 9/2005 | Buniatyan | 455/557 |
| 2006/0236111 | A1* | 10/2006 | Bodensjo et al. | 713/176 |
| 2006/0268329 | A1* | 11/2006 | Lo | 358/1.15 |

* cited by examiner

*Primary Examiner*—Pablo N Tran
(74) *Attorney, Agent, or Firm*—Stephen M. De Klerk; Blakely, Sokoloff, Taylor & Zafmann, LLP

(57) ABSTRACT

A Bluetooth serial adapter comprising a Bluetooth connection module (21) for conducting Bluetooth communication with another Bluetooth enabled device, a serial connector SP allowing connection of a serial cable between the adapter and a device having a serial port, and a serial to Bluetooth interface (23) arranged for: receiving serial connection control commands input via the serial connector; mapping received serial connection control commands to Bluetooth connection control events; and outputting the so determined Bluetooth connection control events to the Bluetooth connection module. The interface (23) may be implemented by making use of a virtual machine provided on the Bluetooth chip.

6 Claims, 5 Drawing Sheets

BLUETOOTH SERIAL ADAPTERS

This application relates to Bluetooth serial adapters.

This is a National Phase of International Application No. PCT/GB2003/003519, filed on Aug. 13, 2003, which claims priority from Great Britain Patent Application No. 0218968.6, filed on Aug. 14, 2002.

Bluetooth® is a recently developed but well known short range radio frequency communication standard, system and protocol. It is used in many different circumstances including, for example, communication between PCs, from PCs to hand held computers, from mobile telephones to PCs, and from mobile telephone handsets to ear pieces.

The Bluetooth system or standard as a whole allows a wide range of different communication regimes. It is therefore very flexible and is set up in a very generic way to allow use in all of these different ways. This however has the side effect that implementing a specific communication system using Bluetooth is complex and uses large amounts of computing resources.

To put this another way, when a fully functional Bluetooth system is used there is a huge processing overhead. Such systems are feasible when implemented using a relatively powerful computer such as a PC running the Windows operating system (for which suitable software tools for controlling Bluetooth connections exist). The systems are not, however, a practical proposition where processing power is limited. Typical cases where processing power is limited are devices which rely on embedded processors. There is a wide range of devices which rely on embedded processors including household, commercial and industrial machines and appliances.

One particular situation where there is an embedded processor and limited processing capability is in the case of mobile telephones and their ear pieces. As mentioned above this is one area where Bluetooth communication is used. Here (and in other similar situations) a subset of Bluetooth is used which only implements specific functions as required. In this case on first activation the two Bluetooth devices (handset and ear piece) must be "bonded" to one another. Once this is done, a connection is made between the two devices and communication can proceed.

Bonding is a simple operation for the user, normally just requiring the pressing of a button (switch) as the devices are activated. Each Bluetooth device has a unique address and during the bonding process these are exchanged in addition to a pin number. After bonding the two devices will "talk" to each other but no other Bluetooth device. If it is desired to allow communication between one of the two devices and a third device, the existing bond must be broken and the new one made by appropriate human, usually manual, intervention.

This necessity makes such systems unworkable where it is desired to have, for example, a central unit which can communicate with a plurality of peripheral units via one Bluetooth connection device at the central unit. Manual intervention would be needed each time it was desired to stop communicating with one peripheral unit in favour of another.

FIG. 1 is a diagram showing the layers of a "dumb" serial cable replacement Bluetooth device that might be used in a simplified Bluetooth communication system of the type described above.

Based on the state of the 'Switch', the layer labelled "Serial Cable Replacement Virtual Machine App" is in one of two modes. In one mode, it allows other Bluetooth devices to be detected and if a 'twin' is detected, then it bonds to that device. In the other mode, if it has details of a previously bonded remote device, then it will attempt to make a Bluetooth connection with it. It will retry continually until a connection is established.

Once connection is established all 'Application' data at the serial port is transparently presented at the RF interface using a serial port profile routed via the RFCOMM layer. When a connection does not exist, the data from the application is dumped.

An alternative way to enable Bluetooth communication from a device having an embedded processor is to provide a system where the processing is carried out on the embedded processor or an associated processor in the device and a separate generic Bluetooth connection device is used. This is analogous to systems where the necessary processing and implementation is carried out by a Windows PC. However, a large amount of programming and/or hardware/firmware changes are required if this route is followed, which has a significant impact on time to market.

In this scenario, the upper layers of the Bluetooth stack reside in the device having the embedded processor (host device). This system will require Bluetooth qualification. In addition, the task of porting the upper layers of the stack onto the host device is not trivial. More functionality can be achieved but the work required as compared to the above solution is many orders of magnitude larger. In addition higher processing demands will be made of the embedded processor. FIG. 2 shows the layers in the host device and the Bluetooth device in such a system.

It is an object of this invention to provide a methods, systems and apparatus for easing Bluetooth communication with devices having limited processing capabilities.

According to one aspect of the present invention there is provided a Bluetooth serial adapter comprising a Bluetooth connection module for conducting Bluetooth communication by transmitting and receiving Bluetooth radio frequency signals with another Bluetooth-enabled device, and a first serial port which allows connection of the adapter to a device having a second serial port, wherein the serial adapter further comprises a serial to Bluetooth interface arranged for:

receiving serial connection control commands input via the first serial port;

mapping received serial connection control commands to Bluetooth connection control events; and outputting the so determined Bluetooth connection control events to the Bluetooth connection module.

According to another aspect of the present invention there is provided a method of communicating via a Bluetooth connection using a device with a serial port, comprising the step of using a Bluetooth serial adapter comprising a Bluetooth connection module for conducting Bluetooth communication by transmitting and receiving Bluetooth radio frequency signals with another Bluetooth enabled device, a first serial port connected to the device having a second serial port, and a serial to Bluetooth interface, the method further comprising the serial to Bluetooth interface carrying out the steps of:

receiving serial connection control commands from the device via the first serial port;

mapping received serial connection control commands to Bluetooth connection control events; and outputting the so determined Bluetooth connection control events to the Bluetooth connection module.

It will be appreciated that the interface can work in both directions within a given device. That is to say Bluetooth and serial connection control events/commands can be sent and received in both directions and mapping can be carried out in both directions during the operation of the adapter, from either the serial port or the RF interface.

According to another aspect of the present invention there is provided a virtual serial connection system between two devices each of which has a serial port, the system comprising a pair of Bluetooth serial adapters as defined above, one of the adapters being connected to a first of the devices and the other of the adapters being connected to the second of the devices, wherein the virtual serial connection is completed by Bluetooth communication between the two Bluetooth serial adapters.

It should be noted that in other aspects of the invention a Bluetooth serial adapter as defined above may be used in communication with another type Bluetooth enabled device. This is on the basis that the other Bluetooth enabled device is operated in a way which is compatible with the Bluetooth serial adapter.

The set of serial connection control commands can be chosen to suit a specific implementation. Typically the set of commands will be limited compared with the vast array of events and capabilities provided in Bluetooth. Thus whilst each serial connection control command is mapped to a corresponding Bluetooth event, in a typical implementation there will be a vast number of Bluetooth events that have no corresponding serial connection control command. Clearly such events cannot be used within the corresponding system or method. However the point is that in facilitating a virtual serial connection, which is the main objective here, the vast majority of the Bluetooth capabilities are irrelevant.

The reduced and simplified command set dramatically simplifies the process of reconfiguring a device having a serial port so as to be able to function with a serial adapter of the present application and thereby facilitate the use of a Bluetooth connection. On one hand the programming or alterations in hardware/firmware needed in the device to allow it to issue and receive appropriate commands is minimised and on the other hand the amount of processing which the device has to carry out is also reduced.

In effect this processing and reconfiguration burden is taken on in the development and operation of the adapter. As such a major part of the reconfiguration effort has to be carried out only once—in the development of the adapter which can be easily used with other devices. Further in each case the overall processing required has been cut down by the development of an adapter designed to perform a specific task and some of this processing is carried out by the adapter itself to further reduce that required in the device having the serial port.

The present application is concerned with the protocols/commands used in controlling a connection between two devices using a Bluetooth connection. Once a connection is established the serial adapter has performed its function. The protocols etc used for transmitting data itself are a separate issue with which this application is not concerned.

In preferred embodiments of the invention the serial connection control commands comprise a command set having commands which are analogous to or more preferably still are directly related to or substantially identical to commands used in an industry standard command set used in controlling Modem connections. This can allow the serial adapter to accept commands from and issue commands to Modems or devices configured to exchange such commands with Modems.

There are likely to be cases where there is a need for commands to be communicated between the adapter and devices which are not by default ready to accept industry standard Modem commands. In the case of such devices reconfiguration/programming will be required but this would be true whatever the command set used so this is no disadvantage. Moreover familiarity with the Modem commands is likely to ease the reconfiguration/programming process.

A command set known as the AT command set, originally developed by Hayes, is currently the most widely used command set for controlling Modem connections. Preferably the serial connection control commands comprise a set of AT commands. These would be familiar to developers/programmers and would be recognised by AT compatible Modems and other devices. It is unlikely to be necessary to use the complete AT command set or protocol in a system of the present kind.

The serial connection control commands may comprise the set of commands or a subset of the commands mentioned and explained in section 3.2 of Annex 1 to the description of this application. The serial connection control commands may comprise a modified set of commands based on the set of commands or a subset of the commands mentioned and explained in section 3.2 of Annex 1 to the description of this application. The modifications may comprise replacing the generic root "AT" (or part of this root) with another root for example "BT" or "TDK".

Typically, the Bluetooth connection module comprises a Bluetooth chip. At least some standard Bluetooth chips carry a programmable virtual machine which may be used to perform secondary functions. In one set of preferred embodiments the serial to Bluetooth interface is implemented by appropriately programming the virtual machine provided on a the Bluetooth chip.

This leads to a particularly efficient solution. The functionality provided by the virtual machine is particularly suited to performing the mapping operation. Further, in many current implementations little or no use is made of the processing power available via the virtual machine.

According to another aspect of this invention there is provided a computer program comprising code portions which when loaded and run on a Bluetooth serial adapter as defined above cause the Bluetooth serial adapter to carry out a method as defined above. The program may be carried on a computer readable data carrier such as a signal or a record medium for example RAM, ROM, EEPROM, a floppy disk, a hard disk, or a CD-ROM.

Embodiments of the present invention will now be described, by way of example only, with reference to the accompanying drawings in which.

Figure 3:
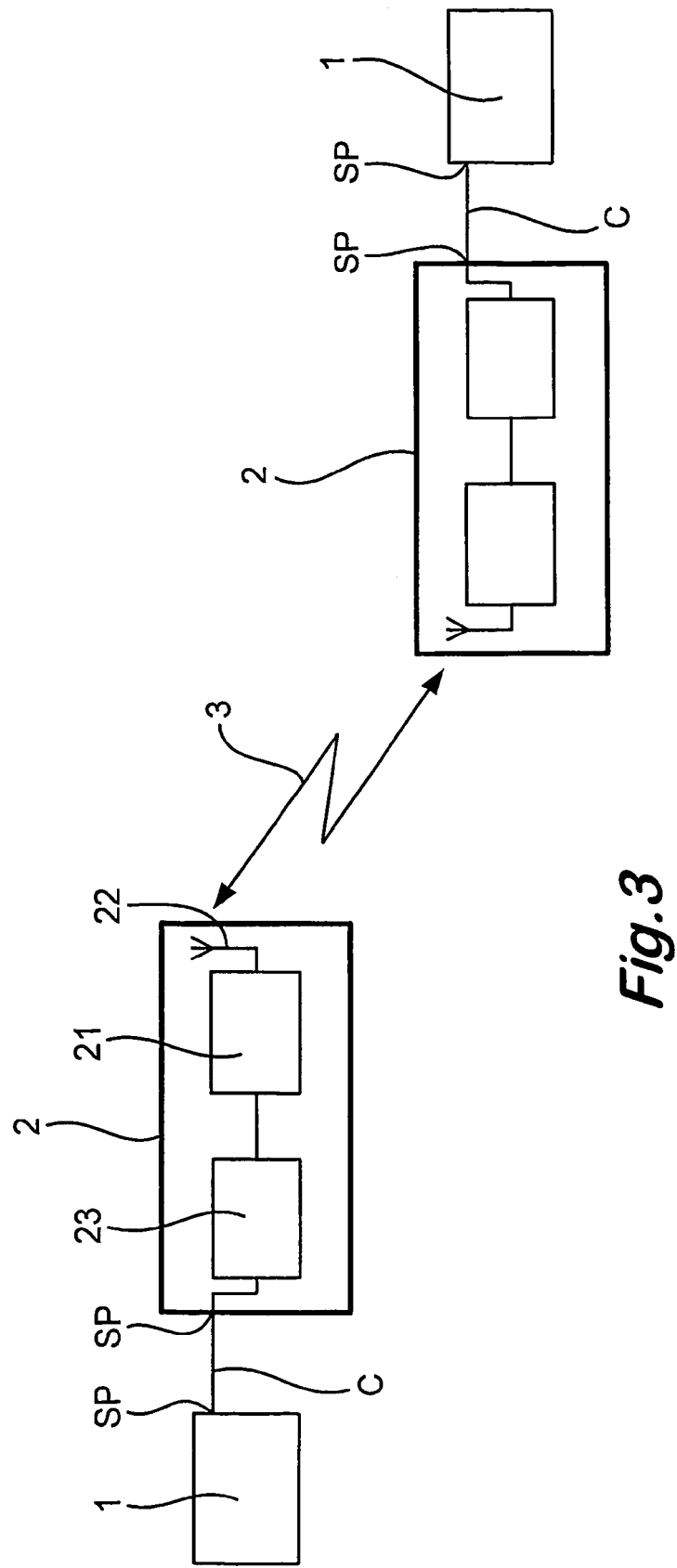
FIG. 3 is a simplified schematic representation of a communication system including Bluetooth serial adapters embodying the present invention.

FIG. 3 schematically shows a communication system where two host devices 1 having embedded microprocessors (not shown) and serial ports SP, are connected to one another to allow the transmission of data therebetween.

If it were not desired to use a wireless connection, the two devices could be connected directly to one another via a serial cable. However, wireless connections carry with them advantages such as eliminating the need to route or re-route cabling.

The present application is concerned with allowing the replacement of serial cable connections with wireless connections and particularly Bluetooth connections. The ideas of the present application are particularly useful where the devices to be connected have embedded processors. Such devices tend to have limited processing capabilities. Further there is generally a desire to minimise the reconfiguration and/or reprogramming of such embedded processors.

In the system shown in FIG. 3, each device is connected via a respective serial cable C to a serial port SP of a respective Bluetooth serial adapter 2. The Bluetooth serial adapters 2 are Bluetooth enabled devices and data can be transmitted between the adapters 2 via Bluetooth radio frequency signals 3.

The functioning of the connection system will be discussed below but at this point it should be noted that as far as the host devices 1 are concerned, once a connection exists via the adapters 2 this is indistinguishable from a direct serial cable connection. The connection system shown in FIG. 3 thus emulates a direct serial cable connection and can be considered as a virtual serial cable connection.

Each Bluetooth serial adapter 2 comprises a Bluetooth connection module 21 including an antenna 22 which is arranged for transmitting and receiving Bluetooth radio frequency signals. Connected between the serial port SP and the Bluetooth connection module 21 is a serial to Bluetooth interface 23.

It should be appreciated that whilst the connection module 21 and interface 23 are shown as separate components in FIG. 3 this is merely to aid understanding. In some implementations the connection module 21 and interface 23 may be implemented by separate items of software controlled hardware. In other implementation this functional separation between the connection module 21 and interface 23 may not be reflected by any clear physical separation of hardware and/or software components.

At least some standard Bluetooth chips are provided with a programmable virtual machine for carrying out secondary functions. In a preferred implementation, used in the applicant's Bluetooth AT Serial Module, a Bluetooth chip (not shown) having such a virtual machine is chosen to drive the connection 21. The functions of the interface 23 are then carried out by appropriately programming the virtual machine provided on the Bluetooth chip.

As part of the system there is defined a command set arranged to allow each device 1 to enable and control connection via its respective adapter 2. These commands may be referred to as serial connection control commands. The command set in this embodiment comprises a selection of commands which are based on the industry standard Hayes AT command set used in controlling Modem connections.

Each host device 1 is either a Modem (or other device) pre-configured to use the appropriate command set or is a device that must be re-configured/programmed to use the appropriate command set. Once either of the above two possibilities is satisfied the host device 1 can enable and further control the connection by issuing the appropriate commands.

The serial to Bluetooth interface 23 operates to receive the commands from the host device 1 via the serial port SP and based on these issues appropriate controlling instructions to the Bluetooth connection module 21, these instructions may be referred to as Bluetooth connection control events. In effect the serial to Bluetooth interface 23 maps serial connection control commands to Bluetooth connection control events.

In the preferred implementation, where the programmed Bluetooth virtual machine is used, serial connection control commands are received and processed by the programmed virtual machine and appropriate controlling signals are output by the machine to control the Bluetooth chip proper.

The above processes all work in reverse. That is to say Bluetooth connection control events received by the interface 23 from the Bluetooth connection module are processed and in effect converted to or mapped to corresponding serial connection control commands which can be output to the respective device 1.

These processes occur in both adapters 2 to enable and control the connection between the two host devices 1.

More details of the command set used in one embodiment, the applicant's Bluetooth AT Serial Module, and examples of when and how these commands are used are given in the attached annex 1 to the description entitled "Technical Proposal—Intelligent Bluetooth Serial Adapter".

It will be appreciated that the command set used may be modified slightly in various ways. If modifications are made it is preferred that the general structure of the commands is kept the same so that familiarity with the AT protocol aids programming. Therefore the generic root "AT" of the commands might be changed to say "BT" or "TDK".

A disadvantage of moving away from the AT based command set is that the command set will then not be usable by existing AT compatible devices without some modification. However this is not an insurmountable problem.

Figure 4:
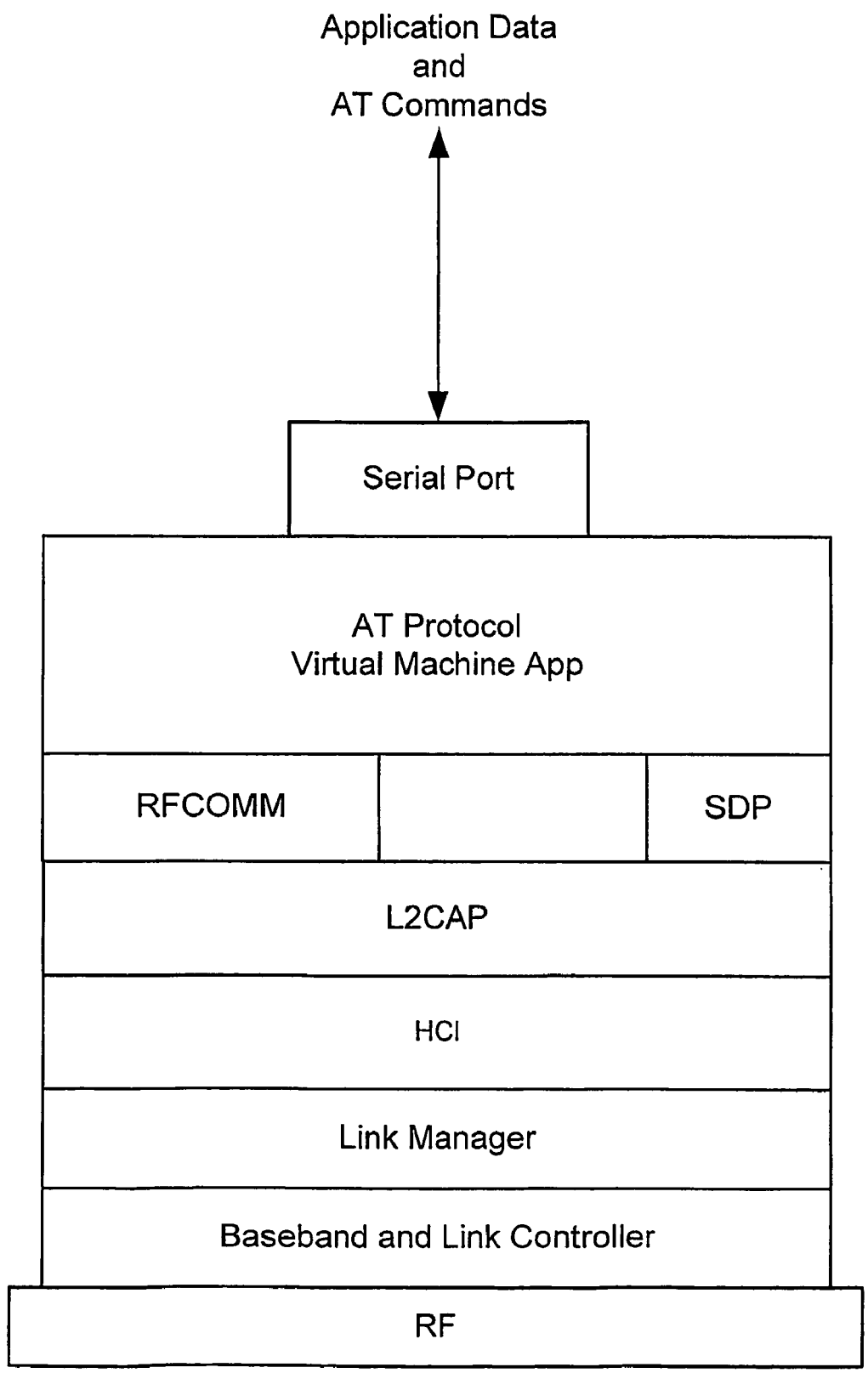
FIG. 4 shows the layers in a Bluetooth AT Serial Module acting as a Bluetooth serial adapter embodying the present invention.

FIG. 4 illustrates the layers in a Bluetooth AT Serial Module which acts as a Bluetooth serial adapter 2 of the same general type shown in FIG. 3 and in which the interface is implemented by appropriately programming the Bluetooth chip virtual machine. It will be noted that the program provided on the virtual machine adds a layer "AT Protocol Virtual Machine App" to the communication system. This can be seen as replacing a corresponding virtual machine layer in the "dumb" serial cable replacement Bluetooth device as shown in FIG. 1.

On power up, the "AT Protocol" layer initialises into an idle state. In this state there is no Bluetooth connection, and it is continually monitoring the 'Application Data'. If the data arriving from the application is a valid 'AT' command then it is actioned. There are 'AT' commands which allow actions such as; perform a Bluetooth Inquiry; Set Local Friendly Name; create Bluetooth Connections; destroy existing connections etc.

When the 'AT Protocol' layer is in the connected state, all application data is routed via RFCOMM to the RF layer for onward transmission to the remote device via the Bluetooth connection.

Figure 1:
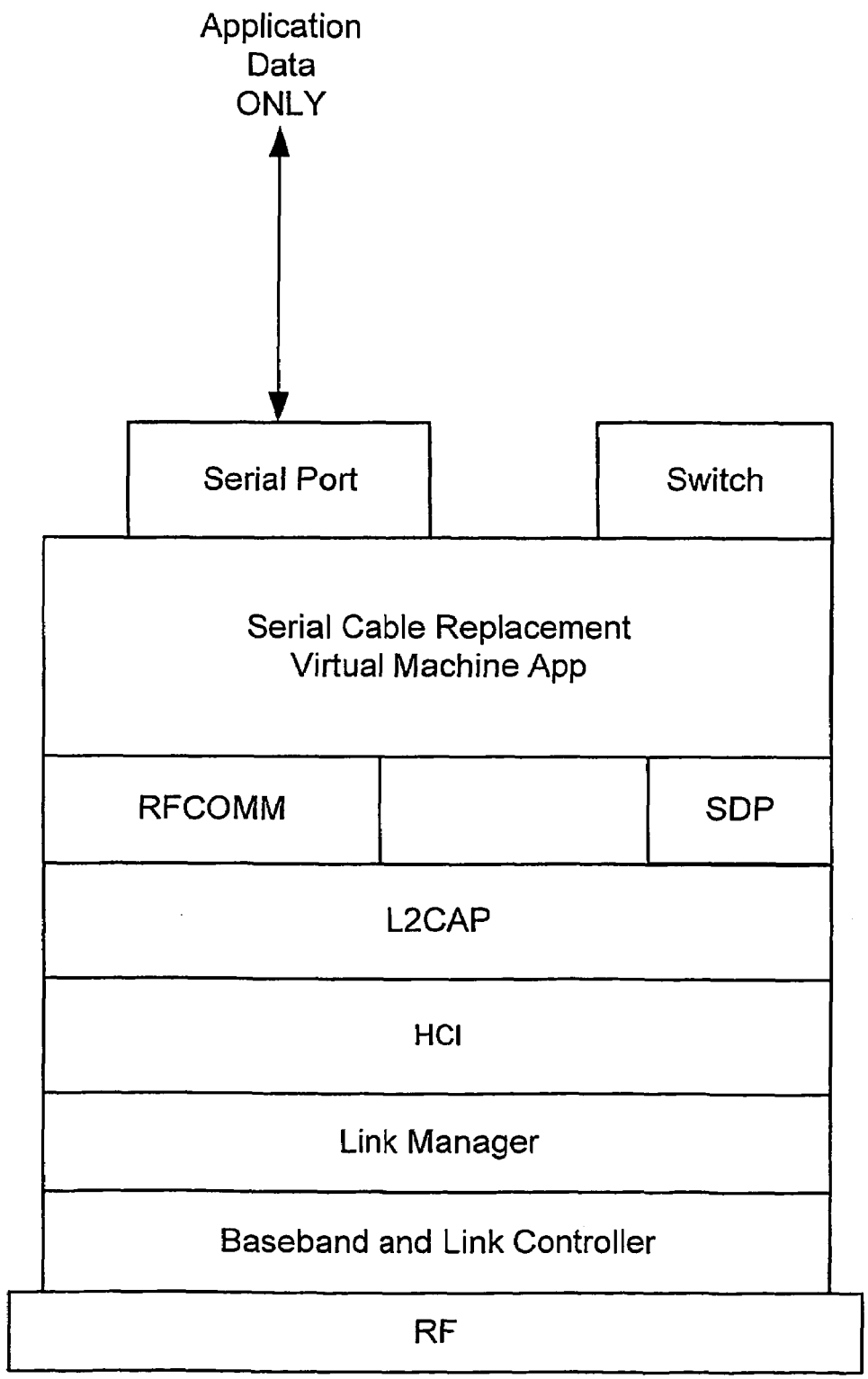
FIG. 1 shows the layers in a prior art "dumb" serial cable replacement Bluetooth communication device.
Figure 2:
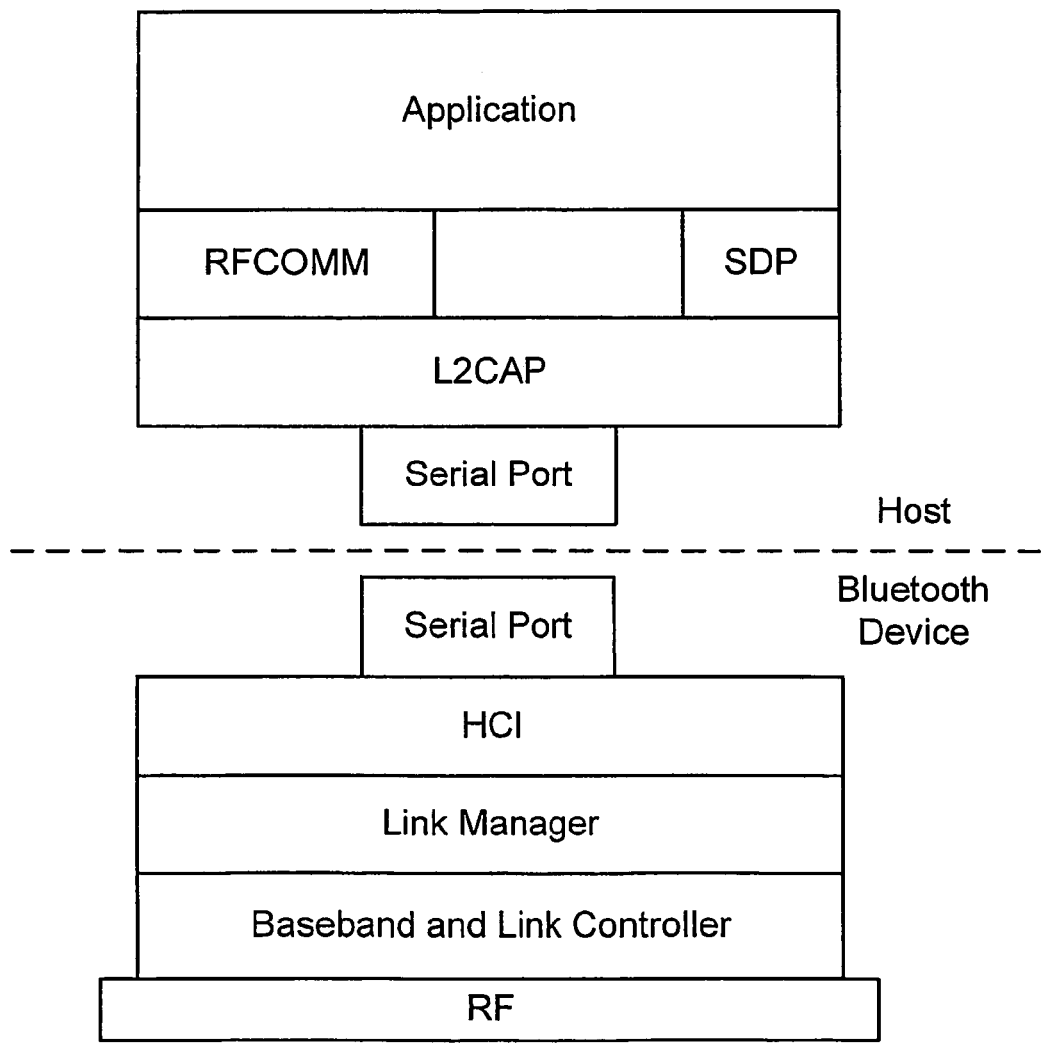
FIG. 2 shows the layers in a host device and Bluetooth device in an alternative Bluetooth communication system, where part of the Bluetooth stack resides on the host device.

The system illustrated in FIG. 1 has been described as a "dumb" serial cable replacement Bluetooth device, in contrast to this, the Bluetooth serial adapters of the present application, for example the Bluetooth AT Serial Module, provide an "intelligent" serial cable replacement. When a serial cable is replaced by the present system there is no need for a pair Bluetooth devices to bond to one another. Through the use of the command set it is possible to establish and terminate connections as and when required.

Moreover the present system simplifies the controls and processing needed in the host devices such that embedded processors can readily deal with the necessary processing and the reconfiguration/reprogramming needed in host devices is kept to manageable levels.

These factors make the use of Bluetooth connections feasible in a whole new set of circumstances. It becomes possible to have a central device with one Bluetooth connection device (for example a Bluetooth AT Serial Module) which can communicate periodically with a plurality of other devices having Bluetooth AT Serial Modules. Communication between the central device and the other devices can be time multiplexed.

This of course can be achieved without human intervention and particularly without manual intervention at the site of each of the other devices. Moreover this is realised using self contained units—for example Bluetooth AT Serial Modules—rather than using separate, external, and expensive, processing power and systems that are required in techniques relying on the use of PCs running Windows. The self contained units (stand-alone modules) also include the necessary antenna.

Figure 5:
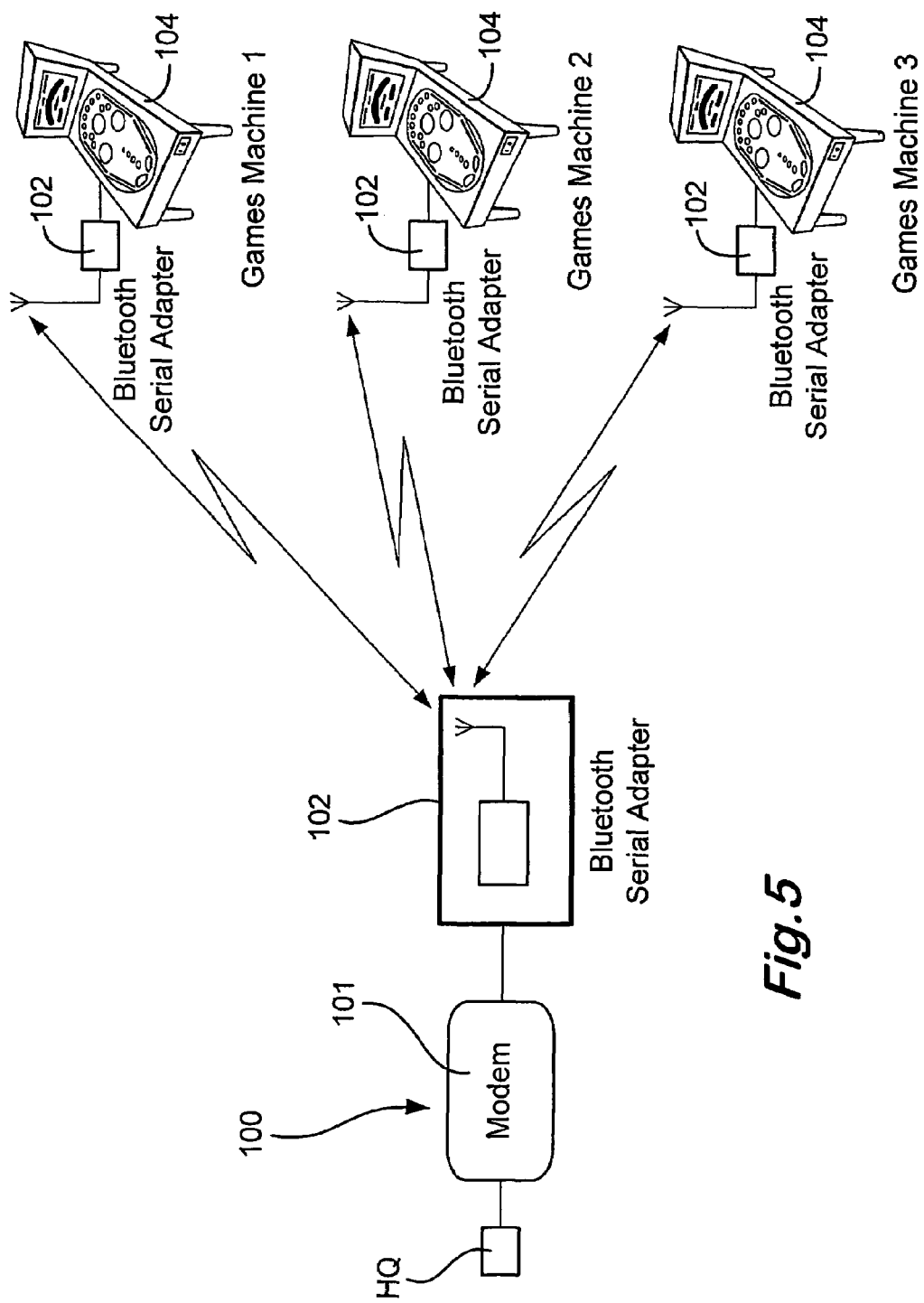
FIG. 5 schematically shows an application for Bluetooth AT Serial Modules embodying the present invention.

FIG. 5 schematically shows a system in which Bluetooth AT Serial Modules of the type described above with reference to FIG. 4 can be used to gather information from a plurality of devices via Bluetooth connections.

In the system of FIG. 5 there is a central unit 100 comprising a Modem 101 connected via a serial cable to a Bluetooth AT Serial Module 102. The central unit is provided in a games arcade where there are a plurality of games machine 104. Only three games machines are shown in FIG. 5, but in practice there might be a far larger number. Each games machine 104 is connected via serial cable to a respective Bluetooth AT Serial Module 102.

Information concerning the operation of each games machine 104 is recorded at the respective games machine 104. This information might for example include the amount of money in the machine's cash box. We assume that there is a desire to log and/or review the information at a computer HQ at a central location which is accessible via the modem 101.

During an initiation stage the Bluetooth AT Serial Module 102 at each games machine 104 is set into an autolisten state by the respective games machine 104 issuing appropriate AT commands. The Bluetooth AT Serial Modules 102 remain in this state and therefore are always ready to receive and send data over the Bluetooth connection 3 to the central unit 100.

In gathering the desired information, the computer HQ at the central location can make a connection to each games machine 104 in turn. When a connection is initiated by the computer HQ, first a connection must be established between the computer, its Modem, and the Modem 101 of the central unit 100. Then the Modem 101 of the central unit 100 issues AT commands to the central unit's Bluetooth AT Serial Module 102. These commands include the identity of the games machine 104 to which connection should be made—games machine 1 in the first instance. Appropriate Bluetooth signals are then transmitted from the central unit 100 and detected by the Bluetooth AT Serial Module 102 of each games machine 104. However, due to the identity of games machine 1 being included in the signals, appropriate AT commands will only be exchanged between games machine 1 and its Bluetooth AT Serial Module 102 so setting up the connection between the central computer HQ and games machine 1. Once the connection is in place data can be transferred from games machine 1 to the central computer HQ. It should be noted that the Bluetooth data connections can be optionally configured to be encrypted to prevent unauthorised "snooping" on the data.

Once this transmission is complete connection to games machine 2 can be initiated and so on.

In alternatives a more complex interleaved time multiplexing system may be used where it is inappropriate to allow whole sets of data to be transmitted in one block. Time slots may be allocated to each device once per successive predetermined periods. In general terms there is little limit to how the capabilities provided by the present system may be used.

Other situations where systems of the present application may be used include: connections between an electronic point of sale device and a number of confectionery/drinks dispensers; connections between a remote data logger and a Bluetooth enabled mobile telephone and onwards to a central computer, and connections between a central computer and a plurality of pieces of test equipment.

ANNEX 1

Technical Proposal Intelligent Bluetooth Serial Adapter

1. Introduction

TDK's BC02 based Bluetooth USB Adapter provides access to the following signals via an optional 40 way connector:

| Pin No | Signal | Description |
|---|---|---|
| 1 | AIO_0 | Spare Analog I/O |
| 2 | PIO_0 | Spare I/O |
| 3 | AIO_1 | Spare Analog I/O |
| 4 | PIO_1 | Spare I/O |
| 5 | SPI_MOSI | SPI bus serial in I/P |
| 6 | PIO_2 | Spare I/O |
| 7 | SPI_CSB | SPI bus chip select I/P |
| 8 | PIO_3 | Spare I/O |
| 9 | SPI_CLK | SPI bus clock I/P |
| 10 | PIO_4 | Spare I/O |
| 11 | GND | |
| 12 | PIO_5 | Spare I/O |
| 13 | RESET | Reset I/P |
| 14 | PIO_6 | Spare I/O - o/b LED |
| 15 | GND | |
| 16 | PIO_7 | Spare I/O - o/b LED |
| 17 | SPI_MISO | SPI bus serial out O/P |
| 18 | GND | |
| 19 | UART_CTS | Clear to Send I/P |
| 20 | PCM_CLK | PCM Clock I/P |
| 21 | UART_TX | Transmit Data O/P |
| 22 | PCM_IN | PCM Data I/P |
| 23 | UART_RTS | Request to Send O/P |
| 24 | PCM_SYNC | PCM Sync I/P |
| 25 | UART_RX | Receive Data I/P |
| 26 | PCM_OUT | PCM Data O/P |
| 27 | VCC_3V3 | 3.3 V Output |
| 28 | N/C | |
| 29 | USB_5V | VIN > 3.6 V |
| 30 | GND | |
| 31 | N/C | |
| 32 | USB_D− | USB D− line |
| 33 | N/C | |
| 34 | USB_D+ | USB D+ line |
| 35 | GND | |
| 36 | GND | |
| 37 | N/C | |
| 38 | GND | |
| 39 | VCC_1V8 | 1.8 V Output |
| 40 | N/C | |

This means it is now possible, with appropriate firmware changes, to construct a cable which gives access to the Bluetooth module via a UART interface. The cable can be passive for embedded applications where the host is exposing a 'TTL' level interface, OR it can be active where there is RS232 level conversion.

Hardware capability is not the entire story. How to 'talk' to the device needs to be addressed as well. We have three options: (1) UART H4 HCI Protocol, (2) UART BCSP HCI Protocol, (3) Raw. The first two require a Bluetooth stack on the host, while the third expects the bluetooth stack to be embedded in the device firmware and any data presented to it at the UART is conveyed via RF over a serial port profile.

Offering our device in the forms of options (1) and (2), imply that our customers need to make considerable investments in developing and/or purchasing an embedded Bluetooth stack for their particular application and platform. This is currently a big barrier preventing a more widespread takeup of Bluetooth wireless solutions in this market sector.

Option (3) offers the easiest, quickest and most cost effective way of Bluetooth gaining a foothold in the embedded and vertical integration market segment.

This document describes the technical 'proof of concept' for an intelligent Bluetooth adapter as opposed to the more conventional 'cable replacement' Bluetooth adapter.

2. Conventional Cable Replacement Serial Adapter

CSR provide a reference design for cable replacement Bluetooth module based on their BC01 and BC02 chipsets.

How does it work?

From a user's perpective, a situation exists where there are two intelligent devices communicating with each other over a serial cable. The user takes two 'cable replacement serial adapters' which will have the same type of connector as the cable and plugs them into the appropriate connectors at both ends of the serial link.

There is then a 'one-off' procedure where these two device are made to bond and from then on, the communicating device are non the wiser that the link has now become virtualised.

If one of these devices is then to be used with another device, manual intervention is required to 'unbond' the two devices so that they can be reused elsewhere. This manual intervention will probably be a significant factor in putting a 'brake' in the takeup of such a device in the embedded market.

This implies that a non-manual reconfigurable 'cable replacement' serial adapter is desirable. For it to be more interesting to the embedded market, the reconfigure protocol must be as simple as possible and preferably uses or borrows concepts from existing protocols.

The next section describes such a device adapted from our existing USB Bluetooth adapter.

3. Intelligent Bluetooth Serial Adapter

The idea for such a device arose from the fact that Bluetooth communication is connection oriented in a fashion very similar to telephony modems. In both cases there is a concept of 'online' and 'offline' modes, in the latter there is also a concept of 'command' mode.

Extending this comparison leads to the logical conclusion that a subset of the AT Command Protocol is a very good candidate to port to a serial Bluetooth adapter.

This implies, that like telephony modems, the serial adapter should power up into a 'RF' deaf and dumb mode and will only respond via the serial interface. Then just like controlling a normal modem, the host can issue commands which map to various Bluetooth activities we are all accustomed with, for example, inquiry, wait for connection, connect, pairing, encryption etc.

This device has a serial interface and an RF communications end point. The latter has a concept of connected and unconnected modes and the former will have a concept of Command and Online mode. This leads to a 2×2 matrix of four states, as shown below.

|  | RF Unconnected | RF Connected |
|---|---|---|
| Command Mode | OK | OK |
| Online Mode | ILLEGAL | OK |

One combination, 'RF unconnected' and 'Online Mode' does not make sense and will be ignored.

Navigating between these states is done using a subset of AT commands and are described in detail in the next section.

3.1 Digital & Analogue I/O

The module gives access to 8 digital i/o lines and 2 analogue lines. The latter can be configured as ADC's or DAC's.

Access to these lines will be provided via the ATS command. Writes to these will be in the form ATSnnn=mmm and reads will be in the form ATSnnn?.

Refer to section 3.2.7 for more details. As a rule S Registers in the range 600 to 699 are dedicated for accessing these i/o lines.

For example, to read analogue line 1, the command ATS601? will result in the most recent sampled value to be returned. Likewise, if line 2 was configured as an output, ATS602=100 will generate a new anlolgue value. All digital lines configured as outputs will be set by ATS6xx=1 and reset using ATS6xx=0.

3.2 AT Command Set 3.2.1 Assumptions

The BC02 in the TDK adapter is memory resource limited. It is also NOT proposed that there be full implementation of the AT protocol as seen in modems. The claim made for this device is that it will have a protocol similar to an AT modem.

Therefore the following assumptions are made:

All commands will be terminated by the carriage return character 0x0D, which is represented by the string <cr>in descriptions below and cannot be changed.

All responses from the adapter will have linefeed and carriage return characters prepending and appending the response. These dual character sequence has the values 0x0A and 0x0D respectively and shall be represented by the string <lf,cr>and cannot be changed.

All Bluetooth addresses shall be represented by a fixed 12 digit hexadecimal string.

All Bluetooth Device Class codes shall be represented by a fixed 6 digit hexadecimal string.

All new Bluetooth specific commands shall be identified by the string +BTx, where x is a mnemonic of the intended functionality.

The device will ALWAYS be in non-echo mode.

All AT Commands shall be in uppercase and no leading or trailing whitespaces are allowed

3.2.2 AT
Response: <lf,cr>OK<lf,cr>

3.2.3 ATZ {Reset}
Resets the device into a known state, which is Command mode and Bluetooth Unconnected. All S Register settings are also set to default.
Response: <lf,cr>OK<lf,cr>

3.2.4 ATR {Hardware Reset}
Forces the device through a hardware reset. This allows changes to the PS store to take effect. For example, a baudrate change via ATS520=command. Allow for about 2 seconds for the device to start responding to AT commands again.
Response: <lf,cr>OK<lf,cr> and then a reset will occur

3.2.5 AT&F {Set Factory Defaults}
Install default values in all S registers. Set friendly name to "TDK nnn" where nnn is the Bluetooth address. Set Device class code to FFFFFF.
Response: <lf,cr>OK<lf,cr>

3.2.6 ATIn {Information}
This will return information about the module. For example, version numbers, manufacturer etc
For n=0, the CSR chipset is returned
Response: <lf,cr>BC2<lf,cr>OK<lf,cr>
For n=1, the CSR firmware build number is returned, for example
Response: <lf,cr>310<lf,cr>OK<lf,cr>
For n=2, the TDK Image number is returned, for example
Response: <lf,cr>06G<lf,cr>OK<lf,cr>
For n=3, the version number of the vm app is returned, for example
Response: <lf,cr>1.01<lf,cr>OK<lf,cr>
For n=4, the colon delimited Bluetooth address of the device is returned
Response: <lf,cr>aabbccddee<lf,cr>OK<lf,cr>
For n=5, the Manufacturer of this device is returned
Response: <lf,cr>TDK Systems Europe Ltd, UK<lf,cr>OK<lf,cr>

3.2.7 ATSn=nnnn {Set S Register}
There is a concept of registers which are used to store parameters, such as escape sequence character, inquiry delay time etc, as listed in detail below.

| Register | Default | Range | Comment |
| --- | --- | --- | --- |
| 0 | 0 | 0 . . . 10 | Number of RING indication before auto answering an inbound connection. If value is set to 0, then set for manual answer. |
| 2 | '^' | 0 . . . 255 | Escape sequence character. It is not '+' by default as a Bluetooth serial link can be used to connect to a mobile phone which exposes an AT command set, which will in turn use '+' as default. So if both used '+' there would be confusion |
| 12 | 100 | 50 . . . 5000 | Escape sequence guard time in milliseconds. |
| 500 | 0 | 0 . . . 1 | Disable Authentication, Set to 1 to Enable Authentication |
| 501 | 0 | 0 . . . 1 | Disable Encryption, Set to 1 to Enable Encryption |
| 502 | 10 | 2 . . . 61 | Inquiry Length in units of seconds. This parameter is referenced by the AT + BTI command |
| 503 | 0 | 0 . . . 255 | Maximum number of responses from an inquiry request. This parameter is reference by the AT+ BTI command |
| 504 | 0 | 0 . . . 2 | The type of response required as a result of issueing an AT + BTI inquiry command. See the description of AT + BTI for more details<br>0 = only Bluetooth address<br>1 = As 0 plus Device Class<br>2 = As 1 plus Friendly name |
| 505 | 5 | 2 . . . 120 | Delay before abandoning connection attempt as a master. Referenced by the ATD. In units of seconds |
| 506 | 5 | 065535 | Delay before abandoning connection attempt as a slave. Referenced by the AT + BTP command. In units of seconds. 0 means D_NEVER |
| 507 | 0 | 0 . . . 1 | When set to 0, a connection can be dropped using ^^^ escape sequence OR the DTR handshaking line |

-continued

| Register | Default | Range | Comment |
| --- | --- | --- | --- |
| 520 | 115200 | 300 ... 921600 | Baudrate. After changing this value, a power cycle is required to make it active |
| 521 | 1 | 1 | 1 = CTS/RTS hardware handshaking enabled |
| 601 | n/a | TBD | Read/Write to Analogue Line 1 |
| 602 | n/a | TBD | Read/Write to Analogue Line 2 |
| 603 | 0 | 0 ... 1 | Set direction of Analogue Line 1 |
| 604 | 0 | 0 ... 1 | Set direction of Analogue Line 2 |
| 610 | 0 | 0 ... 255 | Set direction of digital i/o lines |
| 611 | n/a | 0 ... 1 | Read/Write to PIO_0 |
| 612 | n/a | 0 ... 1 | Read/Write to PIO_1 |
| 613 | n/a | 0 ... 1 | Read/Write to PIO_2 |
| 614 | n/a | 0 ... 1 | Read/Write to PIO_3 |
| 615 | n/a | 0 ... 1 | Read/Write to PIO_4 |
| 616 | n/a | 0 ... 1 | Read/Write to PIO_5 |
| 617 | n/a | 0 ... 1 | Read/Write to PIO_6 |
| 618 | n/a | 0 ... 1 | Read/Write to PIO_7 |
| 619 | n/a | 0 ... 255 | Read/Write to all 8 Digital lines in one atomic step |

Response: <lf,cr>OK<lf,cr>

If the register is not recognised or the value specified is out of range then

Response: <lf,cr>ERROR nn<lf,cr>

3.2.8 ATSn? {Query S Register}

This will return the current value of register n.

For recognised values of n

Response: <lf,cr>As Appropriate<lf,cr>OK<lf,cr>

For unrecognised values of n

Response: <lf,cr>ERROR nn<lf,cr>

3.2.9 ATD123456789012 {Make Connection}

Make a connection to device with Bluetooth address 123456789012. Authentication and Encryption is as per S registers 500 and 501. The timeout is specified by S register 505

Response: <lf,cr>CONNECT<lf,cr>

3.2.10 +++ {Enter Command Mode}

Usually this is the escape sequence for forcing a modem into command mode when in online state. Since this device could be used to connect to a mobile phone modem over a Bluetooth serial port profile, it could confuse matters considerably, therefore the sequence ^^^ used as described next.

3.2.11 ^^^ {Enter Command Mode}

When in online and connected mode, the host can force the device into a command and connected mode so that AT Commands can be issued to the device. The character in this escape sequence is specified in the S2 register, so can be changed. In addition, the escape sequence guard time is specified by S Register 12. By default the guard time is set to 100 milliseconds. Please refer to Section 5: Dropping Connections for more related information.

Response: <lfcr>OK<lf,cr>{To be decided}

3.2.12 ATA {Answer Call}

Accept an incoming connection. Which is indicated by the unsolicited string <lf,cr>RING 123456789012<lf,cr>every second. Where 123456789012 is the Bluetooth address of the connecting device.

Response: <lf,cr>CONNECT<lf,cr>

3.2.13 ATH {Drop Connection}

Drop an existing connection or reject an incoming connection indicated by unsolicited RING messages Response: <lf,cr>OK<lf,cr>

3.2.14 ATO {Enter Online Mode} (letter 'o')

Return to online data mode. Assume online after OK is received. Will respond with ERROR if there is no Bluetooth connection Response: <lf,cr>OK<lf,cr>or Response: <lf,cr>ERROR nn<lf,cr>

3.2.15 AT+BTO {Open and make Unit Detectable}

After power up and ATZ, this command is sent so that RFCOMM is initialised and opened and the service name as specified in AT+BTN is exposed via the SDP registry.

3.2.16 AT+BTQn {Enable/Disable Inquiry Scans}

If n=0, inquiry scans are disabled, and if n I=0 then inquiry scans are enabled. When inquiry scan is enabled, it implies that this device will respond to inquiries from other devices.

Response: <lf,cr>OK<lf,cr>

3.2.17 AT+BTK="012345" {Set Passkey}

Use the pass key 012345 for all subsequent authentication challenges. The value is stored as a string and not a number to ensure leading 0's are retained.

Response: <lfcr>OK<lf,cr>

3.2.18 AT+BTI {Inquire}

This will make the device perform an inquiry for delay milliseconds and max number of unique responses, where delay is specified by S register 502 and max is specified by S register 503. The type of response is specified by S register 504. The format of the responses are as follows:

For S504=0, only the Bluetooth addresses are returned.

Response: <lf,cr>12346789012

<lf,cr>12345678913

<lf,cr>12345678914

<lf,cr>OK<lf,cr>

For S504=1, the Bluetooth addresses and Device class code as 6 character hexadecimal strings are returned.

Response: <lf,cr>12346789012,123456
<lf,cr>12345678913,123456
<lf,cr>12345678914,123456
<lf,cr>OK<lf,cr>

For S504=2, as per S504=1 but in addition, the friendly name is returned bracketed by ". If there are any embedded " characters in the friendly name then it is escaped as ""
Response: <lf,cr>12346789012,123456,"TDK AT DONGLE 1"
<lf,cr>12345678913,123456,"TDK AT DONGLE 2"
<lf,cr>12345678914,123456,"TDK AT DONGLE 3"
<lf,cr>OK<lf,cr>

3.2.19 AT+BTX {Disable Page Scanning}
Disable page scanning. This means it will not accept incoming connections.
Response: <lf,cr>OK<lf,cr>

3.2.20 AT+BTP {Enable Promiscuous Page Scaning}
Enable page scanning and wait for a connection from any device.
Response: <lf,cr>OK<lf,cr>

3.2.21 AT+BTP123456789012 {Enable Cautious Page Scanning}
Enable page scanning and wait for a connection from device with Bluetooth address 123456789012. If the specified address is 000000000000 then incoming connections are accepted from any device, is as per AT+BTP without an address.
Response: <lf,cr>OK<lf,cr>

3.2.22 AT+BTN="My Friendly Name" {Set Friendly Name}
This sets the friendly name of this device as seen by other devices. It will be stored in a non volatile storage area.
Response: <lf,cr>OK<lf,cr>

3.2.23 AT+BTR=123456 {Set Device Class Code for inquiries}
This sets the device class code to be used in all subsequent inquiries which is triggered by the command AT+BTI.
Response: <lfcr>OK<lf,cr>

3.2.24 AT+BTC=123456 {Set Device Class Code for Inq Responses}
This sets the device class code of this device as seen by other devices.
Response: <lfcr>OK<lf,cr>

3.2.25 AT+BTS="New Service Name" {Set Service Name}
This sets the Service name as viewed by other Bluetooth devices when they perform a service discovery.
Response: <lf,cr>OK<lf,cr>

If the service name cannot be set for any reason then an error response ERROR 11 is returned.

4. Incoming Connections

The device can be configured using the AT+BTP command so that it will scan for incoming connections from other Bluetooth devices. The RFCOMM API exposed by CSR is such that incoming calls will be ALWAYS be accepted, if page scanning is enabled. However, through the AT protocol, a host will always be given the choice whether to accept the call or not via the ATA and ATH commands respectively.

So when the lower layers indicate that an incoming call has been accepted, a RING 123456789012 (every second) string is sent to the host. If ATA is sent by the host then CONNECT is immediately sent and the device is put into online mode. If ATH is sent by the host then the connection is dropped and an OK response is sent back.

5. Dropping Connections

In a conventional telephony modem, a call is normally terminated by first sending a +++ character sequence enveloped by an escape sequence guard time (of the order of 100 to 1000 milliseconds) and then the ATH command.

This device will provide two ways of dropping a connection. One method will be similar to the above, but instead a ^^^ character sequence will be used, this is to eliminate ambiguity when a data call is in progress via a mobile phone which was established using the mobile phone's Bluetooth AT modem. The second method will involve the host dropping the DTR handshaking line.

Being able to drop a connection using the escape sequence ^^^ has a severe penalty on data throughput, in fact, the data rate is of the order of 40 kbps instead of about 200 kbps. To cater for this performance hit, the device's connection drop capability is configurable to be in one of two modes.

Mode 1 allows for a connection to be dropped using either method, and Mode 2 allows for a connection drop using the DTR method only. By default, the device is in Mode 1. This mode is selected using the S507 register. See S register table described in an earlier section.

6. Error Responses

All error responses from the device will be in the form <lf,cr>ERROR nn<lf,cr>, where nn will be a number in the range 000 to 999. There shall be leading 0s if the error value is less than 100.

The error values shall be designated as follows:

| Error | Description |
|---|---|
| 00 | Command not recognised |
| 01 | Register not recognised |
| 02 | Value for register is out of range |
| 03 | Incoming call NOT pending |
| 04 | No call to connect to. This error code has meaning for ATO only |
| 05 | Syntax Error |
| 06 | Friendly Name could not be stored: This error code has meaning for AT + BTN only |
| 07 | Empty String |
| 08 | Device Class could not be stored |
| 09 | Invalid Device Class Code |
| 10 | Invalid Bluetooth Address |
| 11 | Could not set Service name |

7. RS232 Signal Pin Mapping

The TDK serial adapter will be a DCE device just like a telephony modem therefore the GPIO pins brought out to the connecter as detailed in section 1 will be used to provide the control signal functionality.

The mapping will be as follows, where direction is as seen by the device and not the host.

| GPIO Pin | Direction | Function |
|---|---|---|
| 0 | IN/OUT | Unused |
| 1 | IN/OUT | Unused |
| 2 | IN/OUT | Unused |
| 3 | OUT | CI also known as RI |
| 4 | IN | DTR |
| 5 | IN/OUT | Unused |

-continued

| GPIO Pin | Direction | Function |
|----------|-----------|----------|
| 6 | OUT | DCD |
| 7 | OUT | DSR |

Notes:
GPIO pin 3 (CI), will normally be deasserted. When an incoming connection is detected it will be asserted, until the connection is either answered or rejected using ATA and ATH respectively.
The state of GPIO pin 4 (DTR) is conveyed to the remote device over RFCOMM, to indicate the ready status of the host to the peer device/host.
GPIO pin 6 (DCD) will be deasserted when the device is in the unconnected state. Asserted when a connection is active. In addition since this pin also controls an LED on our device, there is visual indication of a connection.
GPIO pin 7 (DSR) will be an indication to the host that this device is available. It is also connected to an LED on the device.

With regards to RTS and CTS, they cannot currently (as of Bluelab v2.4) be controlled via the virtual machine. They are controlled/detected by the low level driver. In addition, as of at Bluelab v2.4 it is not possible to disable hardware handshaking.

GPIO Pins 0,1,2 and 5 are available for general purpose use.

8. Use Cases 8.1 Example 1: Light Switch Controller 8.1.1 Background

A small microcontroller controlling a single light switch. The serial port is connected to the AT Dongle and a digital output line drives a relay which controls a light. The remote host sends the text "ON" to switch on the relay and "OFF" to switch it off.

8.1.2 AT Command Sequence

| AT Command | Response | Comment |
|------------|----------|---------|
| ATZ | OK | Resets the device and sets all S Register values to defaults |
| ATN = "Light Switch" | OK | The Service name will appear as "Light Switch" |
| AT + BTC = hhhhh | OK | Sets the Device Class code which can make the discovery process easier. |
| ATS1 = 1 | OK | Auto answer incoming connection after 1 ring |
| AT + BTO | OK | Makes the device detectable and will expose a serial port profile with name "Light Switch" |
| AT + BTP | OK | Will accept incoming connection from any device |
|  | CONNECT | Auto answers call |
| At this point the light switch protocol takes in commands from the remote. For example ON, OFF etc | | |
|  | NO CARRIER | If the remote end drops the connection OR |
| ^^^ | OK | Puts the device in to command mode |
| ATH | OK | Drops the call. |

8.2 Example 2: Remote Data Logger 8.2.1 Background

A data logger on a remote site gathers data which is then transferred to a central site via a Bluetooth enabled phone. Assume that the remote site is accessed via the telephone 02089388609 and the PC connected to the modem logs the data to a file, so all the data logger has to do is open a connection and then send textual data corresponding to the gathered data.

Assume that the data logger knows the BT address of the phone and assume it is 123456789012

Further assume that the Bluetooth Phone exposes a serial port profile through which an AT modem can be accessed.

8.2.2 AT Command Sequence

| AT Command | Response | Comment |
|------------|----------|---------|
| ATZ | OK | Resets the device and sets all S Register values to defaults |
| AT + BTN = "Data Logger" | | |
| AT + BTO | OK | Makes the device detectable and will expose a serial port profile with name "Data Logger" |
| ATD123456789012 | CONNECT | |
| ATZ | OK | The reponse is coming from the Bluetooth phone |
| ATD02089388609 | CONNECT | |
| The data logger sends data which is captured at the remote end. | | |
| +++ | OK | Puts the Bluetooth Phone Modem into command mode |
| ATH | OK | Drops the call to 02089388609 |
| ^^^ | OK | Puts the device into command mode |
| ATH | OK | Drops the Bluetooth connection |

The invention claimed is:

1. A Bluetooth serial adapter comprising a Bluetooth connection module for conducting Bluetooth communication by transmitting and receiving Bluetooth radio frequency signals with another Bluetooth enabled device, and a first serial port which allows connection of the adapter to a device having a second serial port,
wherein the serial adapter further comprises a serial to Bluetooth interface arranged for:
receiving serial connection control commands input via the first serial port;
mapping received serial connection control commands to Bluetooth connection control events; and
outputting the so determined Bluetooth connection control events to the Bluetooth connection module, wherein the serial connection control commands form a set that is smaller than an array formed by the events provided in Bluetooth.

2. A Bluetooth serial adapter as claimed in claim 1, wherein the first serial port has a serial connector which allows connection of a serial cable between the adapter and a device having a second serial port.

3. A Bluetooth serial adapter according to claim 1 in which each serial connection control command is mapped to a corresponding Bluetooth event but there is at least one Bluetooth event that has no corresponding serial connection control command.

4. A Bluetooth serial adapter according to claim 1 in which the serial connection control commands comprise a command set having commands which are one of:
analogous to, directly related to, and substantially identical to, commands used in an industry standard command set used in controlling Modem connections.

5. A Bluetooth serial adapter according to claim 1 in which the serial connection control commands comprise a set of AT commands.

6. A Bluetooth serial adapter according to claim 1 in which the Bluetooth connection module comprises a Bluetooth chip carrying a programmable virtual machine programmed to act as the serial to Bluetooth interface.

* * * * *